United States Patent
Cominsky et al.

(10) Patent No.: US 9,227,718 B2
(45) Date of Patent: Jan. 5, 2016

(54) LOWER JOINTS BETWEEN OUTBOARD WING BOXES AND CENTER WING SECTIONS OF AIRCRAFT WING ASSEMBLIES

(71) Applicant: The Boeing Company, Seal Beach, CA (US)

(72) Inventors: Kenneth D. Cominsky, Mukilteo, WA (US); Jordan Daniel Charles, Seattle, WA (US)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 13/913,099

(22) Filed: Jun. 7, 2013

(65) Prior Publication Data

US 2014/0361121 A1    Dec. 11, 2014

(51) Int. Cl.
*B64C 1/00* (2006.01)
*B64C 1/26* (2006.01)

(52) U.S. Cl.
CPC ........................................ *B64C 1/26* (2013.01)

(58) Field of Classification Search
USPC .............. 244/123.1, 123.7, 123.14, 124, 119, 244/120
See application file for complete search history.

(56) References Cited

U.S. PATENT DOCUMENTS

| | | | |
|---|---|---|---|
| 8,177,167 B2 | 5/2012 | Meyer | |
| 8,371,532 B2 | 2/2013 | Williams et al. | |
| 8,720,824 B2 * | 5/2014 | Martinez Fernandez et al. | 244/123.1 |
| 2006/0018710 A1 | 1/2006 | Durand et al. | |
| 2009/0065644 A1 | 3/2009 | Jacques | |
| 2011/0303357 A1 | 12/2011 | Plaza et al. | |
| 2013/0020440 A1 | 1/2013 | Honorato | |
| 2013/0062467 A1 * | 3/2013 | Soenarjo | 244/123.1 |
| 2015/0053818 A1 * | 2/2015 | Charles et al. | 244/124 |

FOREIGN PATENT DOCUMENTS

| | | |
|---|---|---|
| EP | 2032432 | 7/2010 |
| FR | 916967 | 12/1946 |
| FR | 2970463 | 7/2012 |

OTHER PUBLICATIONS

European Search report for related foreign application EP14171416 dated Oct. 23, 2014 citing to foreign references FR916967 and FR2970463.
Machine generated English translation of FR2970463 abstract.

* cited by examiner

*Primary Examiner* — J. Woodrow Eldred
(74) *Attorney, Agent, or Firm* — DASCENZO Intellectual Property Law, P.C.

(57) ABSTRACT

Lower joints of aircraft wing assemblies are disclosed. In some embodiments, a lower joint includes an outboard lower wing panel, a center lower wing panel, a rib, and a lower joint assembly that includes two outboard flanges operatively coupled to the outboard lower wing panel, an inboard flange operatively coupled to the center lower wing panel, and an upper flange operatively coupled to the rib. In some embodiments, a lower joint assembly includes one or more splice plates, an upper T-fitting, and one or more intermediate plates. In some embodiments, the outboard lower wing panel, the center lower wing panel, and the lower joint assembly are constructed substantially of different materials.

18 Claims, 4 Drawing Sheets

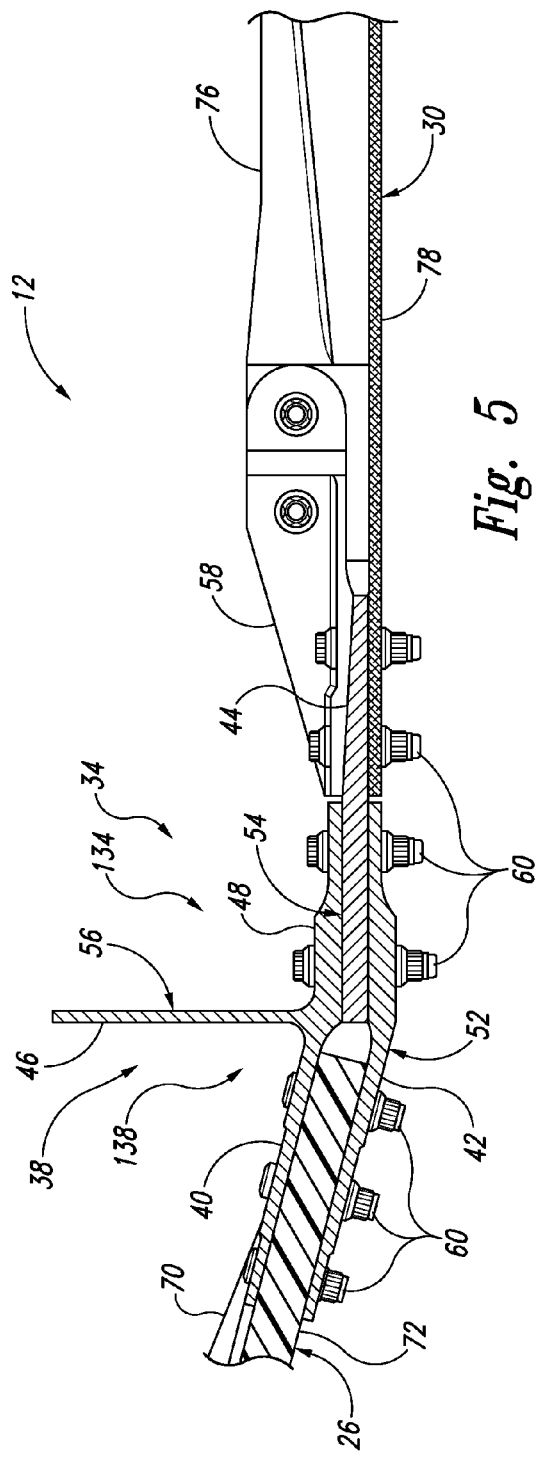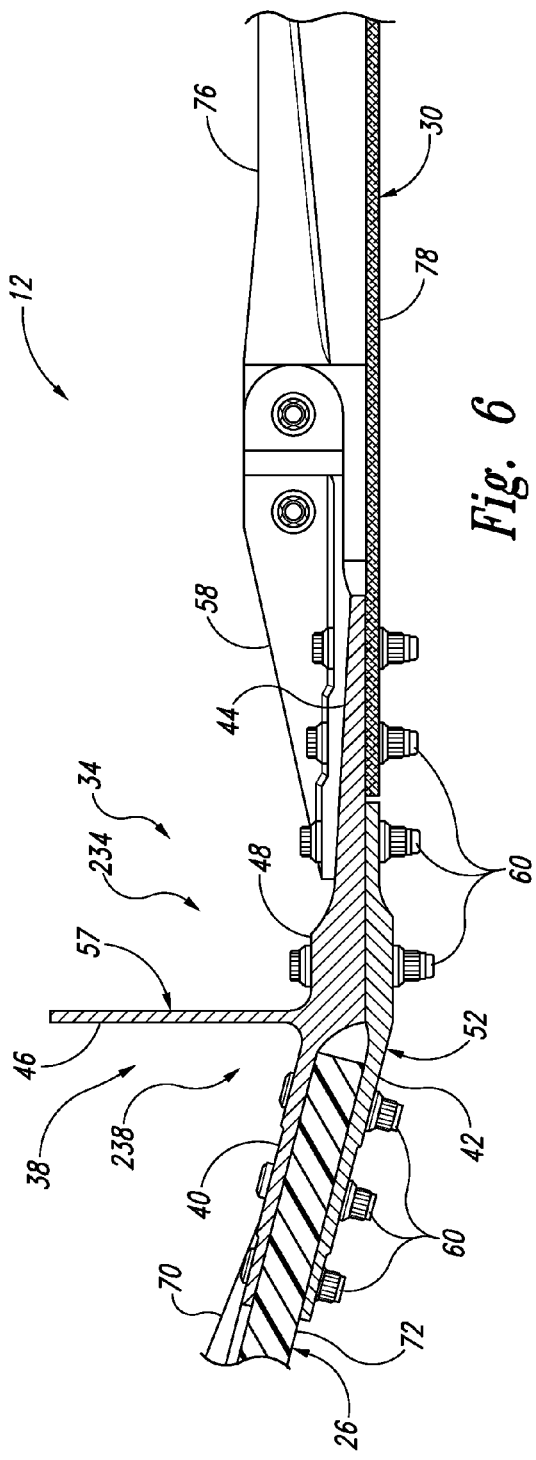

LOWER JOINTS BETWEEN OUTBOARD WING BOXES AND CENTER WING SECTIONS OF AIRCRAFT WING ASSEMBLIES

FIELD

The present disclosure relates to lower joints between outboard wing boxes and center wing sections of aircraft wing assemblies.

BACKGROUND

Historically, the primary structural elements of aircraft have been constructed of aluminum alloys. Recently, many aircraft manufacturers are utilizing composite materials, such as fiber reinforced composite materials due to their high strength-to-weight ratios. However, the tooling and the manufacturing processes associated with such composite materials are not inexpensive. Accordingly, it may be desirable for an aircraft to utilize aluminum alloys for some structural elements and composite materials for other structural elements. However, aluminum alloys and composite materials are not typically compatible with each other from a corrosion standpoint or from a thermal expansion standpoint.

SUMMARY

Aircraft, wing assemblies, lower joints of wing assemblies, and kits for forming lower joint assemblies are disclosed herein.

In some embodiments, a wing assembly for an aircraft may include a left wing box, a right wing box, a wing center section, a left lower joint assembly that defines a left lower joint with the left wing box and the wing center section, and a right lower joint assembly that defines a right lower joint between the right wing box and the wing center section. The left wing box and the right wing box may be constructed substantially of a first material having a first coefficient of thermal expansion. The wing center section may be constructed substantially of a second material that is different from the first material and that has a second coefficient of thermal expansion that is greater than the first coefficient of thermal expansion. The left lower joint assembly and the right lower joint assembly may be constructed substantially of a third material that is different from the first material and the second material and that has a third coefficient of thermal expansion that is greater than the first coefficient of thermal expansion and less than the second coefficient of thermal expansion.

In some embodiments, a lower joint for a wing assembly of an aircraft may include an outboard lower wing panel of an outboard wing box, a center lower wing panel of a wing center section, a rib that defines an interface between the outboard wing box and the center wing section, and a lower joint assembly operatively interconnecting the outboard lower wing panel, the center lower wing panel, and the rib. The joint assembly may include two outboard flanges with the outboard lower wing panel extending between the two outboard flanges in a double shear arrangement, an inboard flange operatively coupled to the center lower wing panel, and an upper flange operatively coupled to the rib.

In some embodiments, a kit for forming a lower joint assembly operable to join an outboard lower wing panel of an outboard wing box, a center lower wing panel of a wing center section, and a rib of an aircraft wing assembly may include one or more lower splice plates, an upper T-fitting, and one or more intermediate plates for positioning between the one or more lower splice plates and the upper T-fitting. The one or more lower splice plates defines a lower of two outboard flanges for operatively receiving the outboard lower wing panel between the two outboard flanges. The upper T-fitting defines an upper of the two outboard flanges and an upper flange for operatively being coupled to the rib. The one or more intermediate plates defines an inboard flange for being coupled operatively to the center lower wing panel.

In some embodiments, a kit for forming a lower joint assembly operable to join an outboard lower wing panel of an outboard wing box, a center lower wing panel of a wing center section, and a rib of an aircraft wing assembly may include one or more lower splice plates and an upper T-fitting. The one or more lower splice plates defines a lower of two outboard flanges for operatively receiving the outboard lower wing panel between the two outboard flanges. The upper T-fitting defines an upper of the two outboard flanges, an upper flange for operatively being coupled to the rib, and an inboard flange for being coupled operatively to the center lower wing panel.

In some embodiments, a kit for forming a lower joint assembly operable to join an outboard lower wing panel of an outboard wing box, a center lower wing panel of a wing center section, and a rib of an aircraft wing assembly may include one or more lower plates and an upper T-fitting. The one or more lower plates defines a lower of two outboard flanges for operatively receiving the outboard lower wing panel between the two outboard flanges, and an inboard flange for being coupled operatively to the center lower wing panel. The upper T-fitting defines an upper of the two outboard flanges and an upper flange for operatively being coupled to the rib.

BRIEF DESCRIPTION OF THE DRAWINGS

FIG. 5 is a fragmentary cross-sectional view of the wing assembly and lower joint of FIG. 4.

FIG. 6 is a fragmentary cross-sectional view of a portion of a wing assembly including another illustrative, non-exclusive example of a lower joint according to the present disclosure.

DESCRIPTION

Figure 1:
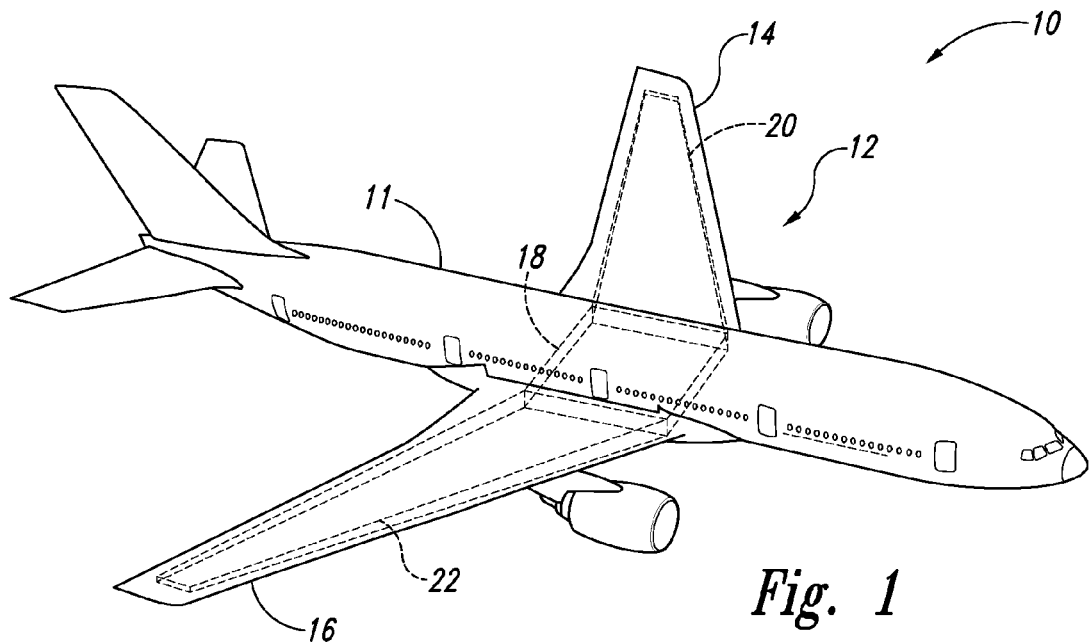
FIG. 1 is a perspective view of an aircraft.

The present disclosure relates to lower joints between outboard wing boxes and center wing sections of aircraft. As seen in FIG. 1, typical aircraft 10 include at least a fuselage 11 and a wing assembly 12 that is operatively coupled to the fuselage and that effectively carries the fuselage during flight. A typical wing assembly includes a left wing 14, a right wing 16, and a center wing section 18 that interconnects the left wing and the right wing. The left wing and the right wing additionally or alternatively may be described as, or referred to as, outboard wing sections. The center wing section may be described as the structure of the wing assembly that operatively joins the wing assembly with the fuselage. In some aircraft, the wing center section may be described as extending through the fuselage. In some aircraft, the wing center section may be described as extending beneath the fuselage.

Figure 2:
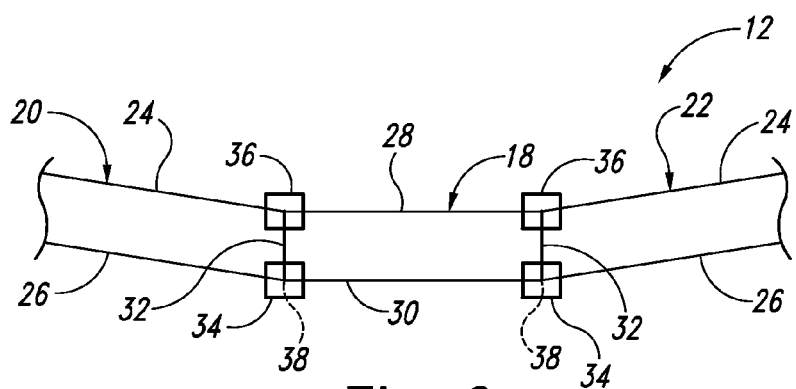
FIG. 2 is a schematic diagram representing wing assemblies according to the present disclosure.

As somewhat schematically illustrated in FIG. 1, the left wing 14 may be described as including a left wing box 20, and the right wing 16 may be described as including a right wing box 22. A wing box generally refers to the structural elements of a wing. FIG. 2 schematically illustrates, in profile, a wing assembly 12, and as seen, each wing box includes at least an outboard upper wing panel 24 and an outboard lower wing panel 26. As used herein, the relative terms 'outboard' and 'inboard' refer to the position and/or direction relative to the wing center section 18. Accordingly, the left wing box and the right wing box each may be described as an outboard wing box. The outboard upper wing panel and the outboard lower wing panel generally define the upper and lower airfoil surfaces of a wing assembly and typically include stiffeners, such as stringers, on the internal side of the wing box and that provide rigidity to the panels. Outboard wing sections typically also include such additional structural elements as a front spar that defines the leading edge of the wing and a rear spar that defines the trailing edge of the wing, as well as ribs that are spaced apart and interconnect the upper panel, the lower panel, the front spar, and the lower spar.

As schematically illustrated in FIG. 2, the wing center section 18 includes a center upper wing panel 28 and a center lower wing panel 30. A pair of ribs 32 defines an interface between, or otherwise separates, the outboard wing boxes from the wing center section. The junction between an outboard lower wing panel 26, a center lower wing panel 30, and a rib 32 may be described as a lower joint 34, as schematically illustrated in FIG. 2. Similarly, the junction between an outboard upper wing panel 24, a center upper wing panel 28, and a rib 32 may be described as an upper joint 36. As schematically illustrated in FIG. 2, the outboard wing boxes typically extend at a dihedral angle from the wing center section. When an aircraft is on the ground, the weight of the wings generally place the upper joints 36 in tension and the lower joints 34 in compression. However, when the aircraft is airborne, the wings are providing lift to the aircraft and the weight of the fuselage relative to the wings is significant. Accordingly, during flight, the upper joints are in compression and the lower joints are in tension. These compressive and tensile forces are the primary loads for these joints, and thus the integrity of these joints is important.

In some embodiments of wing assemblies 12, the outboard wing boxes 20, 22 may be constructed substantially of a first material, while the wing center section may be constructed substantially of a second material that is different from the first material. By 'constructed substantially' of a material, it is meant that at least the upper and lower panels of a wing box or a wing center section are constructed of such material, exclusive of the construction of associated fasteners, the presence of paint or other coatings, etc. Typically, however, the other structural elements, such as stiffeners, ribs, and spars, also will be constructed of such material, again exclusive of associated fasteners, paint, etc.

In some embodiments, the materials selected for construction of the outboard wing boxes 20, 22 and the wing center section 18 may differ in their thermal expansion properties. For example, in some embodiments, the outboard wing boxes may be constructed substantially of a first material that has a first coefficient of thermal expansion, and the wing center section may be constructed substantially of a second material that has a second coefficient of thermal expansion that is greater than the first coefficient of thermal expansion. In some embodiments, the coefficient of thermal expansion of the first material may be on the order of four, eight, or even ten or more times the coefficient of thermal expansion of the second material.

Additionally or alternatively, the materials selected for construction of the outboard wing boxes and the wing center section may differ in their galvanic, or electronegativity, properties. For example, the outboard wing boxes may be constructed substantially of a first material that is toward a cathodic end of a galvanic scale relative to a second material, from which the wing center section is substantially constructed. Additionally or alternatively, the first material may be more electronegative than the second material. Additionally or alternatively, the first material and the second material may be described as being galvanically incompatible. That is, the difference between the first material and the second material on a typical galvanic scale in some embodiments may be greater than 0.1, 0.15, 0.2, 0.25, 0.3, 0.35, or even 0.4 Volts.

As illustrative, non-exclusive examples, the outboard wing boxes may be constructed substantially of a fiber reinforced composite material, such as a carbon fiber reinforced polymer (CFRP) material, and the wing center section may be constructed substantially of a metal, such as of one or more aluminum alloys, including (but not limited to) a 2000 series aluminum alloy and/or a 7000 series aluminum alloy. Fiber reinforced composite materials additionally or alternatively may be described as or referred to as fiber reinforced polymers, or plastics. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers.

As schematically indicated in FIG. 2, a lower joint 34 of a wing assembly 12 may include a lower joint assembly, or structure, 38 that defines the lower joint together with an outboard lower wing panel 26, a center lower wing panel 30, and a rib 32. As used herein, a lower joint assembly 38 refers to a structure or assembly of structures that is distinct from an outboard lower wing panel 26, a center lower wing panel 30, and a rib 32, but that operatively interconnects an outboard lower wing panel, a center lower wing panel, and a rib to collectively define a lower joint 34 of a wing assembly 12.

In embodiments of wing assemblies 12 in which the outboard lower wing panel 26 and the center lower wing panel 30 optionally are constructed of different materials, such as that have different thermal expansion properties and/or different galvanic properties, as discussed herein, it may be desirable for the lower joint assembly 38 to be constructed substantially of a third material that is different from the materials from which the outboard lower wing panel and the center lower wing panel are constructed. In some such embodiments, this third material, from which the lower joint assembly is constructed, may have a coefficient of thermal expansion that is greater than the coefficient of thermal expansion of the material from which the outboard lower wing panel is constructed but that is less than the coefficient of thermal expansion of the material from which the center lower wing panel is constructed. Additionally or alternatively, the material from which the lower joint assembly is constructed may be between, on a galvanic scale, the materials from which the outboard lower wing panel and center lower wing panel are constructed. Additionally or alternatively, the third material from which the lower joint assembly is constructed may be more electronegative than the material from which the outboard lower wing panel is constructed and less electronegative than the material from which the center lower wing panel is constructed. Illustrative, non-exclusive examples of suitable materials for construction of a lower joint assembly 38 include titanium alloys, including grade 5, or Ti6Al4V titanium alloy.

Figure 3:
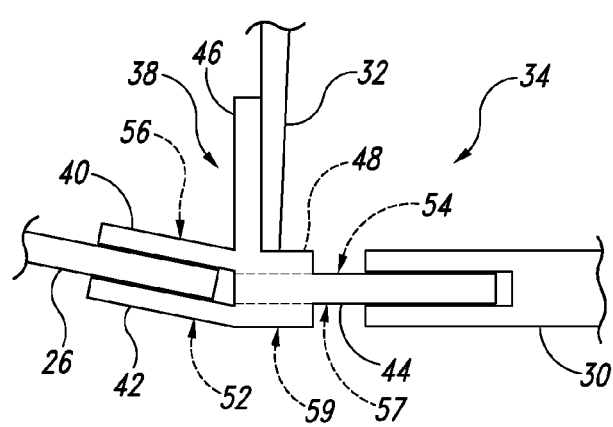
FIG. 3 is a schematic diagram representing illustrative, non-exclusive examples of lower joints according to the present disclosure.

Turning now to FIG. 3, illustrative, non-exclusive examples of lower joints 34 are schematically represented in profile. As indicated and mentioned previously, a lower joint 34 may include an outboard lower wing panel 26 of an outboard wing box, a center lower wing panel 30 of a wing center section, a rib 32 that defines an interface between the outboard wing box and the wing center section, and a lower joint assembly, or structure, 38 that operatively interconnects the outboard lower wing panel, the center lower wing panel, and the rib. In examples of lower joint assemblies corresponding to the schematic representation in FIG. 3, a lower joint assembly may include, or define, an upper outboard flange 40, a lower outboard flange 42, an inboard flange 44, and an upper flange 46. The outboard lower wing panel extends between, and is operatively coupled to, the two outboard flanges in a double shear arrangement. The center lower wing panel is operatively coupled to the inboard flange, and in some embodiments, also in a double shear arrangement. The rib is operatively coupled to the upper flange.

As seen with reference to FIG. 3, the outboard flanges 40, 42 are angled relative to the inboard flange 44 to generally define a dihedral angle between the outboard lower wing panel 26 and the center lower wing panel 30, and thus between the outboard wing box and the wing center section.

Although not required in all embodiments, as optionally illustrated in dashed lines in FIG. 3, a lower joint assembly 38 may be an assembly of more than one structure. More specifically, as schematically illustrated, a lower joint assembly may include one or more lower splice plates 52 that defines the lower outboard flange 42, an upper T-fitting, or T-chord, 56 that defines the upper outboard flange 40 and the upper flange 46, and one or more intermediate plates 54 positioned and operatively coupled between the one or more lower splice plates and the upper T-fitting 56 and that defines the inboard flange 44. In some embodiments, a plurality of lower splice plates may be positioned longitudinally along the lower joint. Similarly, in some embodiments, a plurality of intermediate plates may be positioned longitudinally along the lower joint. In embodiments of lower joint assemblies 38 that include a plurality of lower splice plates and a plurality of intermediate plates, the lower spice plates and the intermediate plates may be sized and positioned so that the seams between adjacent lower splice plates and the seams between adjacent intermediate plates are spaced apart from each other and do not coincide with each other. Such an optional configuration may effectively transfer the chord-wise shear loads in the lower joint 34.

A lower splice plate 52 is so termed because it is positioned on the lower side of a lower joint assembly 38 and may be described as coupling, or splicing, the outboard lower wing panel 26 to one or more intermediate plates 54. An intermediate plate is so termed because it is positioned between, or intermediate of, one or more lower splice plates 52 and the upper T-fitting 56. An upper T-fitting is so termed, because it is positioned above the one or more intermediate plates and because in profile it generally has an upside-down T-shape. The T-fitting therefore may be described as including, or defining, the upper outboard flange 40, the upper flange 46, and an inboard T-flange 48, with the upper flange generally defining the vertical portion of the T-shape and the upper outboard flange and the inboard T-flange collectively defining the horizontal portions of the T-shape, as indicated in FIG. 3.

Additionally or alternatively, in some embodiments, a lower joint assembly 38 may include one or more lower splice plates 52 that defines the lower outboard flange 42, and an upper T-fitting, or T-chord, 57 that defines the upper outboard flange 40, the upper flange 46, and the inboard flange 44. In such embodiments, the upper T-fitting 57 may be described as a combination of an upper T-fitting 56 and one or more intermediate plates 54.

Additionally or alternatively, in some embodiments, a lower joint assembly 38 may include an upper T-fitting 56 that defines the upper outboard flange 40, the upper flange 46 and an inboard T-flange 48, and one or more lower plates 59 that defines the lower outboard flange 42 and the inboard flange 44. In such embodiments, the one or more lower plates 59 may be described as a combination of one or more lower splice plates 52 and one or more intermediate plates 54.

Turning now to FIGS. 4-7, illustrative non-exclusive examples of lower joints 34 are illustrated. Where appropriate, the reference numerals from the schematic illustrations of FIGS. 2-3 are used to designate corresponding parts of the lower joints of FIGS. 4-7; however, the examples of FIGS. 4-7 are non-exclusive and do not limit lower joints 34 and components thereof to the illustrated embodiments of FIGS. 4-7. That is, lower joints 34, and thus wing assemblies 12 and aircraft 10, are not limited to the specific embodiments of the illustrated lower joints of FIGS. 4-7, and lower joints 34, wing assemblies 12, and aircraft 10 may incorporate any number of the various aspects, configurations, characteristics, properties, etc. of lower joints 34 that are illustrated in and discussed with reference to the schematic representations of FIGS. 2-3 and/or the embodiments of FIGS. 4-7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the lower joints of FIGS. 4-7; however, it is within the scope of the present disclosure that the previously discussed features, variants, etc. may be utilized with such lower joints.

Figure 4:
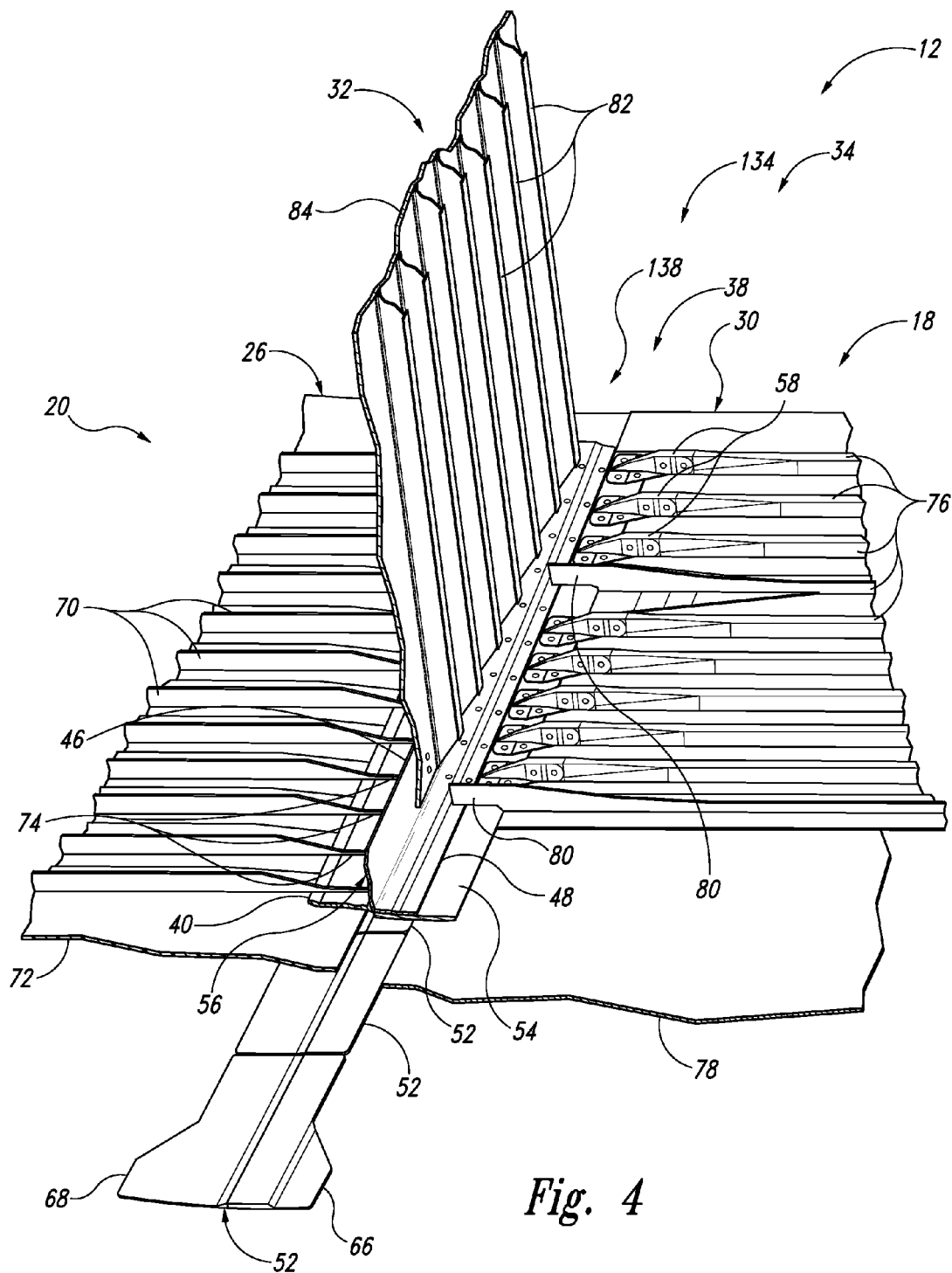
FIG. 4 is an isometric fragmentary view of a portion of a wing assembly including an illustrative, non-exclusive example of a lower joint according to the present disclosure.

As seen with reference to FIGS. 4-5, a first lower joint 134 is an example of a lower joint 34 that includes a lower joint assembly 38 that includes a plurality of lower splice plates 52, a plurality of intermediate plates 54, and a T-fitting 56. The lower joint assembly of lower joint 134 is referred to herein and is indicated in FIGS. 4-5 as a lower joint assembly 138. As best understood with reference to FIG. 4, the lower splice plates and the intermediate plates of lower joint assembly 138 are sized and positioned so that the seams between adjacent lower splice plates and the seams between adjacent intermediate plates do not coincide with each other. The intermediate plates of lower joint assembly 138 may be described as wedge plates, or as wedges, because, as best seen in FIG. 5, they taper in thickness toward the inboard side of the intermediate plates.

As seen with reference to FIG. 4, the end most lower splice plate 52 defines an inboard wing structure 66 and an outboard wing structure 68. The center lower wing panel 30 is positioned atop and engages the inboard wing structure, and the outboard lower wing panel 26 is positioned atop the outboard wing structure. However, other than at the inboard wing structure, the center lower wing panel does not otherwise engage the lower splice plates, as seen with reference to FIG. 5. On the other hand, the outboard lower wing panel extends atop the full longitudinal extent of the lower splice plates.

The outboard lower wing panel 26 of the lower joint 134 may be described as a stiffened outboard lower wing panel because it includes a plurality of stiffeners, or stringers, 70 operatively coupled to a skin 72. As seen in FIG. 4, the upper outboard flange 40 of the T-fitting 56 defines a series of slits 74 that correspond to and receive the inboard terminal end regions of the stiffeners.

The center lower wing panel 30 of the lower joint 134 may be described as a stiffened center lower wing panel because it includes a plurality of stiffeners, or stringers, 76 operatively coupled to a skin 78. As seen with reference to FIGS. 4-5, a subset of the stiffeners 76 are operatively coupled to the intermediate plates 54 with paddle fittings 58. A paddle fitting is a fitting that interconnects two components that are generally perpendicular to each other. With reference to FIG. 5, the skin 78 and the paddle fittings define a double shear arrangement with the intermediate plates. In the example illustrated in FIGS. 4-5, the paddle fittings 58 are sized and configured to be utilized with two rows of fasteners 60; however, it is within the scope of lower joints 34 according to the present disclosure, that paddle fittings 58 may additionally or alternatively be sized and configured to be utilized with more than two rows of fasteners 60, including with one or more rows of fasteners that operatively couple the T-fitting, the intermediate plates, and the lower splice plates, such as with one or both of the two rows of fasteners 60 that are proximal to the upper T-flange 46 of the T-fitting on the inboard side of the T-fitting.

In lower joint 134, paddle fittings are not utilized with a separate subset of spaced-apart stiffeners 76. Instead, these stiffeners each include an outboard terminal end region 80 that extends over a respective intermediate plate 54 and the inboard T-flange 48 of the T-fitting 56. These outboard terminal end regions are provided for operative attachment to corresponding spanwise beams of the wing center section.

The rib 32 of lower joint 134 may be described as a stiffened rib because it includes a plurality of stiffeners, or stringers, 82 operatively coupled to a skin 84 As best seen in FIG. 5, a plurality of fasteners 60 are utilized to operatively join the outboard lower wing panel 26 to the outboard flanges 40, 42, to operatively join the center lower wing panel 30 to the intermediate plates 54, and to operatively join the lower splice plates 52, the intermediate plates 54, and upper T-fitting 56.

With continued reference to FIG. 5, the combined thickness of the lower outboard flange 42, the skin 72 of the outboard lower wing panel 26, and the upper outboard flange 40 proximal to the upper flange 46 is equal to, or is at least substantially equal to, the combined thickness of lower splice plate 52, the intermediate plate 54, and the inboard T-flange 48 proximal to the upper flange 46. Such a configuration, although not required to all embodiments of lower joints 34, may result in a transfer of loads between the outboard wing box and the wing center section without eccentricities.

Moreover, in lower joint assembly 138, the thickness of the inboard T-flange 48 and the lower splice plates 52 are stepped down, or reduced, on the inboard side of the lower joint assembly. Such a configuration, although not required, results in a weight savings over a configuration without such an optional stepped down configuration.

Turning now to FIG. 6, a second lower joint 234 is an example of a lower joint 34 that includes a lower joint assembly 38, indicated at 238, that includes one or more lower splice plates 52 that defines the lower outboard flange 42, and an upper T-fitting 57 that defines the upper outboard flange 40, the upper flange 46, and the inboard flange 44.

Figure 7:
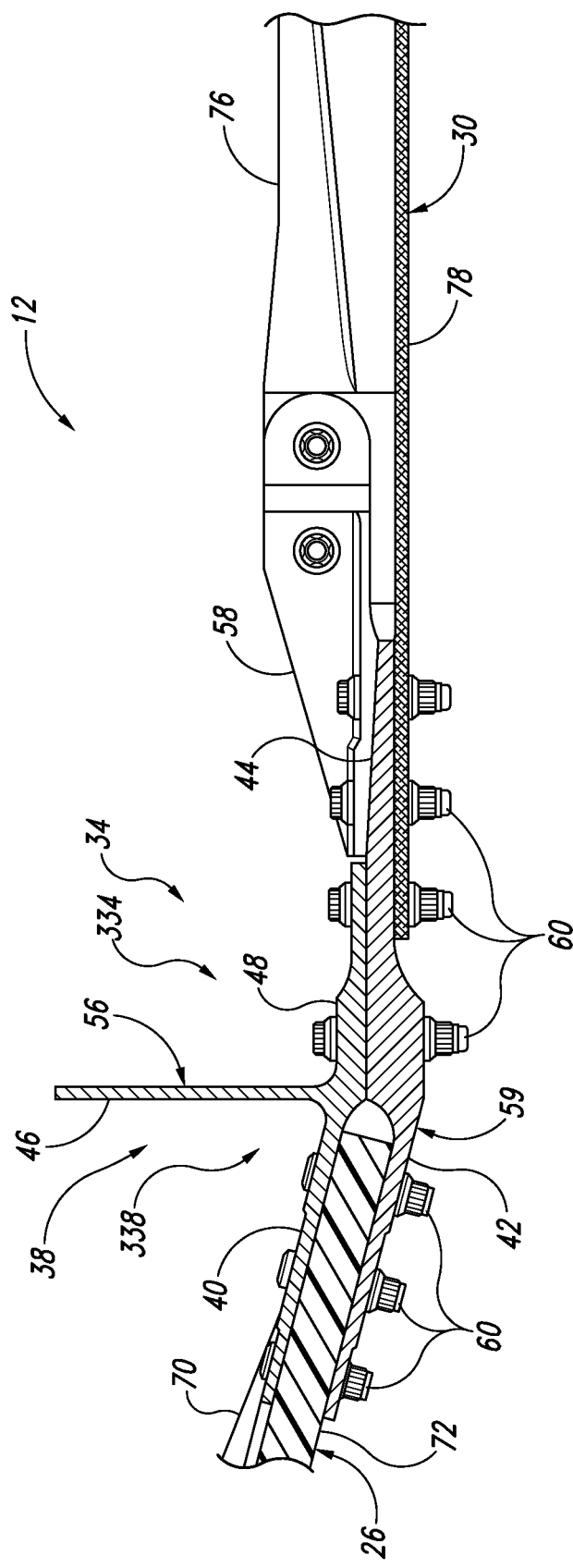
FIG. 7 is a fragmentary cross-sectional view of a portion of a wing assembly including another illustrative, non-exclusive example of a lower joint according to the present disclosure.

FIG. 7 illustrates a third lower joint 334, which is an example of a lower joint 34 that includes a lower joint assembly 38, indicated at 338, that includes one or more lower plates 59 that defines the lower outboard flange 42 and the inboard flange 44, and an upper T-fitting 56 that defines the upper outboard flange 40 and the upper flange 46.

Illustrative, non-exclusive examples of inventive subject matter according to the present disclosure are described in the following enumerated paragraphs:

A. A wing assembly for an aircraft, the wing assembly comprising:
a left wing box constructed substantially of a first material;
a right wing box constructed substantially of the first material; and
a wing center section constructed substantially of a second material that is different from the first material.

A1. The wing assembly of paragraph A,
wherein the first material has a first coefficient of thermal expansion; and
wherein the second material has a second coefficient of thermal expansion that is greater than the first coefficient of thermal expansion.

A2. The wing assembly of any of paragraphs A-A1,
wherein the first material is toward a cathodic end of a galvanic scale relative to the second material; and/or
wherein the first material is more electronegative than the second material.

A3. The wing assembly of any of paragraphs A-A2, wherein the first material is a fiber reinforced composite material, and optionally a carbon fiber reinforced composite material.

A4. The wing assembly of any of paragraphs A-A3, wherein second material is a metal, and optionally an aluminum alloy.

A5. The wing assembly of any of paragraphs A-A4, further comprising:
a left lower joint assembly that defines a left lower joint with the left wing box and the wing center section; and
a right lower joint assembly that defines a right lower joint with the right wing box and the wing center section;
wherein the left lower joint assembly and the right lower joint assembly are constructed substantially of a third material.

A5.1. The wing assembly of paragraph A5 when depending from paragraph A1, wherein the third material has a third coefficient of thermal expansion that is greater than the first coefficient of thermal expansion and less than the second coefficient of thermal expansion.

A5.2. The wing assembly of any of paragraphs A5-A5.1 when depending from paragraph A2,
wherein the third material is between the first material and the second material on the galvanic scale; and/or
wherein the third material is more electronegative than the second material and less electronegative than the first material.

A5.3. The wing assembly of any of paragraphs A5-A5.2, wherein the third material is a metal, and optionally a titanium alloy.

A5.4. The wing assembly of any of paragraphs A5-A5.3, wherein the left lower joint and the right lower joint each include the lower joint of any of paragraphs B-B3.6.

A6. An aircraft, comprising:
a fuselage; and
the wing assembly of any of paragraphs A-A5.4.

B. A lower joint for a wing assembly of an aircraft, the lower joint comprising:
an outboard lower wing panel of an outboard wing box;
a center lower wing panel of a wing center section;
a rib that defines an interface between the outboard wing box and the center wing section; and
a lower joint assembly operatively interconnecting the outboard lower wing panel, the center lower wing panel, and the rib, wherein the joint assembly includes:

two outboard flanges, wherein the outboard lower wing panel extends between the two outboard flanges in a double shear arrangement;

an inboard flange operatively coupled to the center lower wing panel; and an upper flange operatively coupled to the rib.

B1. The lower joint of paragraph B, wherein the inboard flange is operatively coupled to the center lower wing panel in a double shear arrangement.

B1.1. The lower joint of paragraph B1, wherein the center lower wing panel is a stiffened center lower wing panel and includes a plurality of paddle fittings operatively coupling the stiffened center lower wing panel to the inboard flange in a double shear arrangement.

B2. The lower joint of any of paragraphs B-B1.1, wherein the lower joint assembly includes:

one or more lower splice plates that defines a lower of the two outboard flanges;

an upper T-fitting that defines an upper of the two outboard flanges and the upper flange; and one or more intermediate plates operatively coupled between the one or more lower splice plates and the upper T-fitting, wherein the one or more intermediate plates defines the inboard flange.

B2.1. The lower joint of paragraph B2, wherein the one or more lower splice plates includes a plurality of lower splice plates positioned longitudinally along the lower joint.

B2.2. The lower joint of any of paragraphs B2-B2.1, wherein the one or more intermediate plates includes a plurality of intermediate plates positioned longitudinally along the lower joint.

B2.2.1. The lower joint of paragraph B2.2 when depending from paragraph B2.1, wherein each intermediate plate of the plurality of wedge plates overlaps at least two lower splice plates of the plurality of lower splice plates; and/or wherein seams between adjacent intermediate plates of the plurality of intermediate plates are spaced apart from seams between adjacent lower splice plates of the plurality of lower splice plates.

B3. The lower joint of any of paragraphs B-B1.1, wherein the lower joint assembly includes:

one or more lower splice plates that defines a lower of the two outboard flanges; and an upper T-fitting that defines an upper of the two outboard flanges, the upper flange, and the inboard flange.

B3.1. The lower joint of paragraph B3, wherein the one or more lower splice plates includes a plurality of lower splice plates positioned longitudinally along the lower joint.

B4. The lower joint of any of paragraphs B-B1.1, wherein the lower joint assembly includes:

one or more lower plates that defines a lower of the two outboard flanges and the inboard flange; and an upper T-fitting that defines an upper of the two outboard flanges and the upper flange.

B4.1. The lower joint of paragraph B4, wherein the one or more lower plates includes a plurality of lower plates positioned longitudinally along the lower joint.

B5. The lower joint of any of paragraphs B-B4.1, wherein the outboard lower wing panel is constructed substantially of a first material;

wherein the center lower wing panel is constructed substantially of a second material that is different from the first material; and wherein the lower joint assembly is constructed substantially of a third material that is different from the first material and the second material.

B5.1. The lower joint of paragraph B5, wherein the rib is constructed substantially of the second material.

B5.2. The lower joint of any of paragraphs B5-B5.1, wherein the first material has a first coefficient of thermal expansion;

wherein the second material has a second coefficient of thermal expansion that is greater than the first coefficient of thermal expansion; and the third material has a third coefficient of thermal coefficient that is greater than the first coefficient of thermal expansion and less than the second coefficient of thermal expansion.

B5.3. The lower joint of any of paragraphs B5-B5.2, wherein the first material is toward a cathodic end of a galvanic scale relative to the second material, and wherein the third material is between the first material and the second material on the galvanic scale; and/or wherein the first material is more electronegative than the third material, and wherein the third material is more electronegative than the second material.

B5.4. The lower joint of any of paragraphs B5-B5.3, wherein the first material is a fiber reinforced composite material, and optionally a carbon fiber reinforced composite material.

B5.5. The lower joint of any of paragraphs B5-B5.4, wherein second material is a metal, and optionally an aluminum alloy.

B5.6. The lower joint of any of paragraphs B5-B5.5, wherein the third material is a metal, and optionally a titanium alloy.

C. A kit for forming a lower joint assembly operable to join an outboard lower wing panel of an outboard wing box, a center lower wing panel of a wing center section, and a rib of an aircraft wing assembly, the kit comprising:

one or more lower splice plates that defines a lower of two outboard flanges for operatively receiving the outboard lower wing panel between the two outboard flanges;

an upper T-fitting that defines an upper of the two outboard flanges and an upper flange for operatively being coupled to the rib; and one or more intermediate plates for positioning between the one or more lower splice plates and the upper T-fitting, wherein the one or more intermediate plates defines an inboard flange for being coupled operatively to the center lower wing panel.

C1. The kit of paragraph C, wherein the one or more lower splice plates includes a plurality of lower splice plates, and wherein the one or more intermediate plates includes a plurality of intermediate plates.

C1.1. The kit of paragraph C1, wherein each intermediate plate of the plurality of intermediate plates is sized to overlap at least two lower splice plates of the plurality of lower splice plates; and/or wherein each intermediate plate of the plurality of intermediate plates and each lower splice plate of the plurality of lower splice plates are sized so when the lower joint assembly is assembled, seams between adjacent intermediate plates are spaced apart from seams between adjacent lower splice plates.

C2. The kit of any of paragraphs C-C1.1, wherein the one or more lower splice plates, the upper T-fitting, and the one or more intermediate plates are constructed substantially of metal, and optionally of a titanium alloy.

D. A kit for forming a lower joint assembly operable to join an outboard lower wing panel of an outboard wing box, a center lower wing panel of a wing center section, and a rib of an aircraft wing assembly, the kit comprising:

one or more lower splice plates that defines a lower of two outboard flanges for operatively receiving the outboard lower wing panel between the two outboard flanges; and an upper T-fitting that defines an upper of the two outboard flanges, an upper flange for operatively being coupled to the rib, and an inboard flange for being coupled operatively to the center lower wing panel.

D1. The kit of paragraph D, wherein the one or more lower splice plates includes a plurality of lower splice plates.

D2. The kit of any of paragraphs D-D1, wherein the one or more lower splice plates and the upper T-fitting are constructed substantially of metal, and optionally of a titanium alloy.

E. A kit for forming a lower joint assembly operable to join an outboard lower wing panel of an outboard wing box, a center lower wing panel of a wing center section, and a rib of an aircraft wing assembly, the kit comprising:

one or more lower plates that defines a lower of two outboard flanges for operatively receiving the outboard lower wing panel between the two outboard flanges, and an inboard flange for being coupled operatively to the center lower wing panel; and an upper T-fitting that defines an upper of the two outboard flanges and an upper flange for operatively being coupled to the rib.

E1. The kit of paragraph E, wherein the one or more lower plates includes a plurality of lower plates.

E2. The kit of any of paragraphs E-E1, wherein the one or more lower plates and the upper T-fitting are constructed substantially of metal, and optionally of a titanium alloy.

The various disclosed elements of apparatuses disclosed herein are not required to all apparatuses, and the present disclosure includes all novel and non-obvious combinations and subcombinations of the various elements disclosed herein. Moreover, one or more of the various elements disclosed herein may define independent inventive subject matter that is separate and apart from the whole of a disclosed apparatus. Accordingly, such inventive subject matter is not required to be associated with the specific apparatuses that are expressly disclosed herein, and such inventive subject matter may find utility in apparatuses that are not expressly disclosed herein.

The invention claimed is:

1. A wing assembly for an aircraft, the wing assembly comprising:
    a left wing box;
    a right wing box;
    a wing center section;
    a left lower joint assembly that defines a left lower joint with the left wing box and the wing center section; and
    a right lower joint assembly that defines a right lower joint between the right wing box and the wing center section;
    wherein the left wing box and the right wing box are constructed substantially of a first material having a first coefficient of thermal expansion, wherein the wing center section is constructed substantially of a second material that is different from the first material and that has a second coefficient of thermal expansion that is greater than the first coefficient of thermal expansion, and wherein the left lower joint assembly and the right lower joint assembly are constructed substantially of a third material that is different from the first material and the second material and that has a third coefficient of thermal expansion that is greater than the first coefficient of thermal expansion and less than the second coefficient of thermal expansion.

2. The wing assembly of claim 1, wherein the first material is more electronegative than the third material, and wherein the third material is more electronegative than the second material.

3. The wing assembly of claim 1, wherein the first material is a fiber reinforced composite material, wherein second material is an aluminum alloy.

4. The wing assembly of claim 3, wherein the third material is a titanium alloy.

5. The wing assembly of claim 1, wherein the left lower joint and the right lower joint each include:
    an outboard lower wing panel of a respective one of the left wing box and the right wing box;
    a center lower wing panel of the wing center section;
    a rib that defines an interface between the wing center section and a respective one of the left wing box and the right wing box; and
    a lower joint assembly operatively interconnecting the outboard lower wing panel, the center lower wing panel, and the rib, wherein the lower joint assembly includes:
        two outboard flanges, wherein the outboard lower wing panel extends between the two outboard flanges in a double shear arrangement;
        an inboard flange operatively coupled to the center lower wing panel; and
        an upper flange operatively coupled to the rib.

6. An aircraft, comprising:
    a fuselage; and
    the wing assembly of claim 1.

7. A lower joint for a wing assembly of an aircraft, the lower joint comprising:
    an outboard lower wing panel of an outboard wing box, wherein the outboard lower wing panel is constructed substantially of a first material;
    a center lower wing panel of a wing center section, wherein the center lower wing panel is constructed substantially of a second material that is different from the first material;
    a rib that defines an interface between the outboard wing box and the wing center section; and
    a lower joint assembly operatively interconnecting the outboard lower wing panel, the center lower wing panel, and the rib, wherein the lower joint assembly is constructed substantially of a third material that is different from the first material and the second material, and wherein the lower joint assembly includes:
        two outboard flanges, wherein the outboard lower wing panel extends between the two outboard flanges in a double shear arrangement;
        an inboard flange operatively coupled to the center lower wing panel; and
        an upper flange operatively coupled to the rib.

8. The lower joint of claim 7, wherein the center lower wing panel is a stiffened center lower wing panel and includes a plurality of paddle fittings operatively coupling the stiffened center lower wing panel to the inboard flange in a double shear arrangement.

9. The lower joint of claim 7, wherein the lower joint assembly includes:
    one or more lower splice plates that defines a lower of the two outboard flanges;
    an upper T-fitting that defines an upper of the two outboard flanges and the upper flange; and
    one or more intermediate plates operatively coupled between the one or more lower splice plates and the upper T-fitting, wherein the one or more intermediate plates defines the inboard flange.

10. The lower joint of claim 9, wherein the one or more lower splice plates includes a plurality of lower splice plates positioned longitudinally along the lower joint.

11. The lower joint of claim 9, wherein the one or more intermediate plates includes a plurality of intermediate plates positioned longitudinally along the lower joint.

12. The lower joint of claim 9,
wherein the one or more lower splice plates includes a plurality of lower splice plates positioned longitudinally along the lower joint;
wherein the one or more intermediate plates includes a plurality of intermediate plates positioned longitudinally along the lower joint; and
wherein seams between adjacent intermediate plates of the plurality of intermediate plates are spaced apart from seams between adjacent lower splice plates of the plurality of lower splice plates.

13. The lower joint of claim 7,
wherein the first material has a first coefficient of thermal expansion;
wherein the second material has a second coefficient of thermal expansion that is greater than the first coefficient of thermal expansion; and
wherein the third material has a third coefficient of thermal expansion that is greater than the first coefficient of thermal expansion and less than the second coefficient of thermal expansion.

14. The lower joint of claim 7, wherein the first material is more electronegative than the third material, and wherein the third material is more electronegative than the second material.

15. The lower joint of claim 7, wherein the first material is a fiber reinforced composite material, wherein the second material is an aluminum alloy, and wherein the third material is a titanium alloy.

16. The lower joint of claim 7, wherein the outboard lower wing panel is constructed substantially of a fiber reinforced composite material, wherein the center lower wing panel is constructed substantially of an aluminum alloy, and wherein the lower joint assembly is constructed substantially of a titanium alloy.

17. The lower joint of claim 7, wherein the lower joint assembly includes:
one or more lower splice plates that defines a lower of the two outboard flanges; and
an upper T-fitting that defines an upper of the two outboard flanges, the upper flange, and the inboard flange.

18. The lower joint of claim 7, wherein the lower joint assembly includes:
one or more lower plates that defines a lower of the two outboard flanges and the inboard flange; and
an upper T-fitting that defines an upper of the two outboard flanges and the upper flange.

* * * * *